United States Patent
Angele et al.

(10) Patent No.: US 7,293,010 B2
(45) Date of Patent: Nov. 6, 2007

(54) ENTERPRISE INFORMATION INTEGRATION PLATFORM

(75) Inventors: Jürgen Angele, Kandel (DE); Jürgen Harbarth, Darmstadt (DE); Harald Schöning, Dieburg (DE); Walter Waterfeld, Darmstadt (DE); Kay Winkler, Darmstadt (DE); Björn Brauel, Darmstadt (DE)

(73) Assignees: Ontoprise GmbH, Karlsruhe (DE); Software A.G., Darmstadt (DE)

( * ) Notice: Subject to any disclaimer, the term of this patent is extended or adjusted under 35 U.S.C. 154(b) by 378 days.

(21) Appl. No.: 11/106,599

(22) Filed: Apr. 15, 2005

(65) Prior Publication Data

US 2006/0167856 A1  Jul. 27, 2006

(30) Foreign Application Priority Data

Jan. 25, 2005  (EP)  ................. 05001407

(51) Int. Cl.
*G06F 7/00* (2006.01)
(52) U.S. Cl. ............................. 707/1; 707/10
(58) Field of Classification Search .............. 707/1–10, 707/100, 101, 104.1
See application file for complete search history.

(56) References Cited

U.S. PATENT DOCUMENTS

| | | |
|---|---|---|
| 2002/0023091 A1 | 2/2002 | Silberberg et al. |
| 2003/0101170 A1 | 5/2003 | Edelstein et al. |
| 2003/0120665 A1 | 6/2003 | Fov et al. |
| 2003/0163450 A1 | 8/2003 | Borenstein et al. |
| 2003/0163597 A1 | 8/2003 | Hellman et al. |
| 2003/0177481 A1 | 9/2003 | Amaru et al. |
| 2003/0179228 A1 | 9/2003 | Schreiber et al. |
| 2004/0093331 A1* | 5/2004 | Garner et al. ................ 707/3 |
| 2004/0093344 A1 | 5/2004 | Berger et al. |
| 2004/0093559 A1 | 5/2004 | Amaru et al. |
| 2004/0098401 A1 | 5/2004 | Angele |
| 2004/0216030 A1 | 10/2004 | Hellman et al. |
| 2006/0074980 A1* | 4/2006 | Sarkar ................... 707/104.1 |
| 2006/0161544 A1* | 7/2006 | Lee et al. ................... 707/6 |

FOREIGN PATENT DOCUMENTS

WO  2 21259  3/2002

OTHER PUBLICATIONS

*Stoimenov et al., "Framework for Semantic GIS Interoperability", Facta Universitatis, Series Mathematics and Informatics, 2002, vol. 17, pp. 107-122.
*Wenhua et al., "Integrating Diverse CIM Data Bases: The Role of Natural Language Interface", IEEE Transactions on Systems, Man and Cybernetics, IEEE Inc., Nov. 1, 1992, vol. 22, No. 6, pp. 1331-1346.

(Continued)

*Primary Examiner*—Wilson Lee
(74) *Attorney, Agent, or Firm*—Buchanan Ingersoll & Rooney PC

(57) ABSTRACT

A system for enterprise information integration is described. The system is based on different layers:
 the data sources,
 source ontologies corresponding to the data schema of the data sources,
 an integration ontology integrating the different source ontologies,
 a level of query input, preferably in the form of a web service.

Between the levels, mapping rules are used. These mapping rules and the entire system are based on predicate logic. The queries are answered with the help of the rules using inference based on predicate logic.

18 Claims, 4 Drawing Sheets

OTHER PUBLICATIONS

*Staab et al., "Semantic community Web portals", Computer Networks, Jun. 2000, vol. 33, No. 1-6, pp. 473-491.

*Kifer et al., "F-Logic: A Higher-Order Language for Reasoning about Objects, Inheritance, and Scheme", ACM Proceedings of Sigmod. International Conference on Management of Data., May 31, 1989, vol. 18, No. 2, pp. 134-146.

* cited by examiner

ENTERPRISE INFORMATION INTEGRATION PLATFORM

FIELD OF THE INVENTION

The present invention relates to unified querying of distributed data sources and methods for the efficient recovery of information stored in distributed data sources.

BACKGROUND OF THE INVENTION

Enterprise data systems, especially for large enterprises, typically include multiple data sources that may be based on different data schemas like
relational databases,
XML documents, XML schema, XML document type definitions (DTD),
web services,
Adabas files
SGML texts,
Interface Description Language (IDL),
JAVA interface,
Resource Description Framework (RDF),
Unified Modeling Language (UML),
Ontology Web Language (OWL),
Object role modelling,
Topic maps,
etc.

As a result of several IT generations and/or mergers and acquisitions, several databases with different schemas may contain information on different areas of the business. For example, enterprise employment data may be stored in a relational database conforming to a first relational database schema and enterprise accounting data may be stored in a relational databases conforming to a second relational database schema. Often these various data sources may overlap, and it is difficult for a user to query across the enterprise data sources.

There is, thus, a need for tools for data integration or information integration and a need for a unified querying tool that enables a user to query data across data sources conforming to different data schemas. The need for a unified querying tool also arises when a single question crosses multiple data sources.

DESCRIPTION OF RELATED ART

The patent applications U.S. 2004/0216030 A1, U.S. 2004/0093559 A1, U.S. 2004/0093344 A1, U.S. 2003/0179228 A1, U.S. 2003/0177481 A1, U.S. 2003/0163597 A1, U.S. 2003/0163450 A1, U.S. 2003/0120665 A1, and U.S. 2003/0101170 A1, all belonging to one family, describe the mapping of data schema, including inter alia relational database schema and XML schema, into a central ontology model for solving the data integration problem. (Ontologies will be described in more detail below.) Basic constructs of the different data schema are mapped to classes and properties of the central ontology model. Thus, for a relational database schema, tables are generally mapped to ontology classes, and fields of tables are generally mapped to properties of the classes. Similarly, for XML schema, complex types are generally mapped to ontology classes, and elements and properties within complex types are generally mapped to ontology properties.

The disadvantage of the prior art method is its limited flexibility. The integration of a new data schema regularly requires extensive new programming.

SUMMARY OF THE INVENTION

It is, therefore, an object of the present invention to provide flexible means for information integration.

This aim is achieved by the inventions as claimed in the independent claims. Advantageous embodiments are described in the dependent claims, the disclosure of which is hereby incorporated into the description by reference.

Although no multiple referenced claims are drawn, all reasonable combinations of the features in the claims shall be disclosed.

According to a first exemplary embodiment, the invention comprises a system, preferably a computer system, for unified querying of distributed data sources conforming to different data schema.

The system comprises a plurality of data sources conforming each to a given data schema. The different data schema of the data sources can e.g. be a relational database, an XML text, a web service, etc. The different data sources can be stored in different storage means, on different computers in a network, at different plants, or on one computer or one hard disk drive.

Each data schema has constructs for organizing the data and a data schema query language, like SQL, XQuery, a remote procedure call of an API of a web service, etc.

The system also comprises a plurality of source ontologies, each corresponding to one data source. Each source ontology comprises a group of constructs. Generally, the group of constructs comprises at least classes and properties of the classes. Sometimes in the literature, the classes are called "categories" and the properties are called "attributes". Usually, also object properties (sometimes called "relations") among classes and the inheritance of properties are incorporated into the ontologies. Besides object properties, so called datatype properties are the norm, for which the properties of a class can be defined in the form of data.

The data are called instances of the classes. In other words: classes are sets and the data/instances are members of the sets. The instances of classes are called objects.

The object model is preferably realized as a hierarchical structure of classes. Within hierarchical structures, the classes in a predetermined level are respectively allocated to precisely one class of a superior level, meaning only single inheritances are permitted. In general, the class structure can also be more generally embodied as an acyclic graph for which multiple inheritances are permitted.

An example for a class can be the class "person". An example of a property for the class person is the "name" of a person. Classes or data can be linked via object properties. E. g., person A is "cooperating with" person B.

A mapping between each data source and its corresponding source ontology is defined. With the help of the mapping, constructs of the data schema of the data source are mapped to constructs of the source ontology. E.g. for a relational database schema, tables are generally mapped to classes of the source ontology and fields of tables are generally mapped to properties of the classes.

The mapping between each data source and its corresponding source ontology is accomplished using a declarative system of rules based on predicate logic. One important characteristic of a declarative system of rules is that the result of an evaluation of the rules does not depend on the sequence of the definition of the rules.

The mapping comprises means for querying the data source with the data schema query language of the data source.

Furthermore, the system comprises at least one integration ontology. Again, the integration ontology comprises a group of constructs, generally at least classes and properties.

In a preferred embodiment, the integration ontology has an ontology query language associated therewith. The ontology query language of the integration ontology does not necessarily have to be the same as that of the source ontologies, although it usually is, for practical reasons.

The system provides a mapping between each source ontology and the integration ontology. In intuitive words, the integration ontology is a top level or global ontology. Using the mapping constructs of the source ontologies are mapped to constructs of the integration ontology. It is the integration ontology which gives a unified view on the data. It enables the information integration.

The mapping does not necessarily map a class of a source ontology to a class of the integration ontology and a property to a property. The ontologies can have different value units, different names, different structures, which might make it more appropriate in individual cases to map a certain class to a property. E. g. one source ontology may have the class "laser-printer" while the integration ontology may have the class "printers" with the property "type", an instance (realization, data) of which could be "laser-printer".

Again, the mapping between the source ontologies and the integration ontology is accomplished using a declarative system of rules based on predicate logic.

The system also comprises query means for inputting a query related to the data of the data sources.

Finally, there is at least one inference unit based on predicate logic for evaluating the query with the help of the rules. It is the inference unit that answers the query. For this purpose, the inference unit evaluates the rules, it chooses those rules, which are suitable for answering the question. In a top-down-approach, the rules successively lead from the integration ontology to the relevant source ontologies. Furthermore, the rules mapping the relevant source ontology to the corresponding data source comprise means for querying that data source with the data schema query language of that data source. These means translate queries into the language of the data schema. These queries can be answered and the results returned. These results are used by the inference unit to answer the query posed on the web service level. Thus, the inference unit serves as runtime unit for answering queries. Using the information from the ontologies and the rules it directly queries the underlying data sources. It is a separate unit and not part of the ontology structure.

The main advantages of the system over the prior art resides in the powerful and flexible capabilities of the rules used for the mapping. Structures can be transformed; constructs can be renamed; values can be changed, transformed or calculated with.

The system based on ontologies and declarative rules offers unequalled possibilities of modelling data and know-how.

Also, it is easy to integrate a new data source with a new data schema into the system. It suffices to define a mapping between a new source ontology and the new data schema. The mapping between the source ontology and the integration ontology then does not require new programming know-how; pure modelling suffices.

To achieve many of the advantages of the system, it is important to base the system on predicate logic or rules based on predicate logic and not on business rules, which are often used in the prior art. This may need some explanation. If we restrict predicate logic to horn logic with negation (normal logic) then business rules and normal logic rules seem to be closely related at least from their surface representation, i.e. from their syntax. In contrast their underlying background theory are fundamentally different. Normal logic is based on a well-defined theory: the model theory of predicate logic. A Herbrand model is a (sometimes infinite) set of facts. The meaning of a set of normal logic rules and facts is defined by a unique minimal Herbrand model. So, loosely spoken, a set of normal logic rules and facts is an abbreviation for a set of facts, the minimal Herbrand model. This minimal Herbrand model is defined independently from the given sequence of the rules, from the given sequence of the rule bodies and independently from the inference algorithm to compute this model. For the meaning of business rules no theory is available. The meaning of a set of business rules is given by a simple inference algorithm: the Rete algorithm. The outcome of this algorithm is strongly dependent on the sequence of the rules, the sequence of the rule bodies and the operations used in the rule heads. So there is no independent theory what a set of rules means, but it has to be waited for an answer of the inference algorithm to get an idea of what the set of rules does. To make things worse, every business rule system behaves differently.

To enhance the ease of use of the system, the source ontology corresponding to a data source and its data schema can be automatically generated. The same applies for the automatic generation of the mapping between a source ontology and its corresponding data source.

As mentioned, predicate logic may be used to define ontologies and mappings between them in an unambiguous way. This definition may then be implemented in any programming language. These models can be executed directly using an inference engine. Thus, there is no loss of information or reinterpretation of information during the implementation phase and, thus, the execution corresponds to the original meaning and, additionally, the execution may be started immediately.

To speed up working with the system, the inference unit, which serves as runtime engine, can dynamically access the rules and the structure of the ontologies during the evaluation of a query. A way to accomplish this is given, when the inference unit accesses the data structure in which the model is stored. This allows for dynamically modelling the data integration and at the same time querying the modelled structure. Thus, the model can be tested. Also, knowledge engineers and users of the system can work on the system at the same time.

In a preferred embodiment, the integration ontology has an ontology query language associated therewith and the system comprises means for translating each query into the ontology query language of the integration ontology.

To further improve the flexibility and performance of the system, at least one of the ontologies is complemented by a declarative system of rules based on predicate logic for expressing additional information.

To conform to a widespread standard, the system comprises in a preferred embodiment at least one query unit in the form of a web service for inputting a query relating to the data of the data sources. This query is translated from the web service input to the ontology query language of the integration ontology, allowing unified queries of the distributed data. In general, for all relevant queries a separate web service is defined.

In order to make as much use as possible of the capabilities of the data schema query language and to speed up the evaluation of queries, the system comprises means for identifying queries or rules or combinations of rules that can be combined into a complex query in the data schema query language of the data source and means for translating these queries or rules or combinations of rules into a complex query in the data schema query language of the data source. E.g. for a relational database, queries combining different tables and field and their entries can be identified and translated into a corresponding SQL query.

To further accelerate the evaluation of queries during runtime, the system comprises means for dynamically filtering those data or rules or queries which cannot have an impact on answering the query posed on the web service level.

To better serve the needs of different user groups, the system can comprise a plurality of integration ontologies, integrating different data sources or integrating identical data sources and representing each a different view on the data.

The object of the invention is also achieved by a method. In what follows, individual steps of a method will be described in more detail. The steps do not necessarily have to be performed in the order given in the text. Also, further steps not explicitly stated may be part of the method.

The method comprises choosing a plurality of data sources conforming each to a given data schema, each data schema having constructs for organizing the data and a data schema query language associated therewith.

A plurality of source ontologies is created, each corresponding to one data source, whereby each source ontology comprises a group of constructs, the group of constructs comprising generally at least classes and properties.

Furthermore, a mapping between each data source and its corresponding source ontology is defined, wherein constructs of the data schema of the data source are mapped to constructs of the source ontology, and wherein the mapping comprises means for querying the data source with the data schema query language of the data source, and wherein the mapping between each data source and its corresponding source ontology is accomplished using a declarative system of rules based on predicate logic.

Also, an integration ontology is defined, whereby the integration ontology comprises a group of constructs, the group of constructs comprising generally at least classes and properties.

A mapping between each source ontology and the integration ontology is defined, wherein constructs of the source ontologies are mapped to constructs of the integration ontology, and wherein the mapping between the source ontologies and the integration ontology is accomplished using a declarative system of rules based on predicate logic.

A query related to the data of the data sources is posed and evaluated with the help of the rules using at least one inference unit based on predicate logic.

Furthermore, the object of the invention is achieved by:
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding claim, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network,
a computer program product having program code means, wherein the program code means can be stored or are stored on a storage medium, for performing the method according to one of the embodiments described in this description, if the program code means are executed on a computer or on a computer network,
at least one of an operating system, a computer readable medium having stored thereon a plurality of computer-executable instructions, a co-processing device, a computing device and a modulated data signal carrying computer executable instructions for performing the method according to one of the embodiments described in this description.

Other objects and advantages of the present invention may be ascertained from a reading of the specification and appended claims in conjunction with the drawings.

BRIEF DESCRIPTION OF THE DRAWINGS

For a more complete understanding of the present invention, reference is established to the following description made in connection with accompanying drawings in which.

DETAILED DESCRIPTION OF THE PREFERRED EMBODIMENTS

Figure 1:
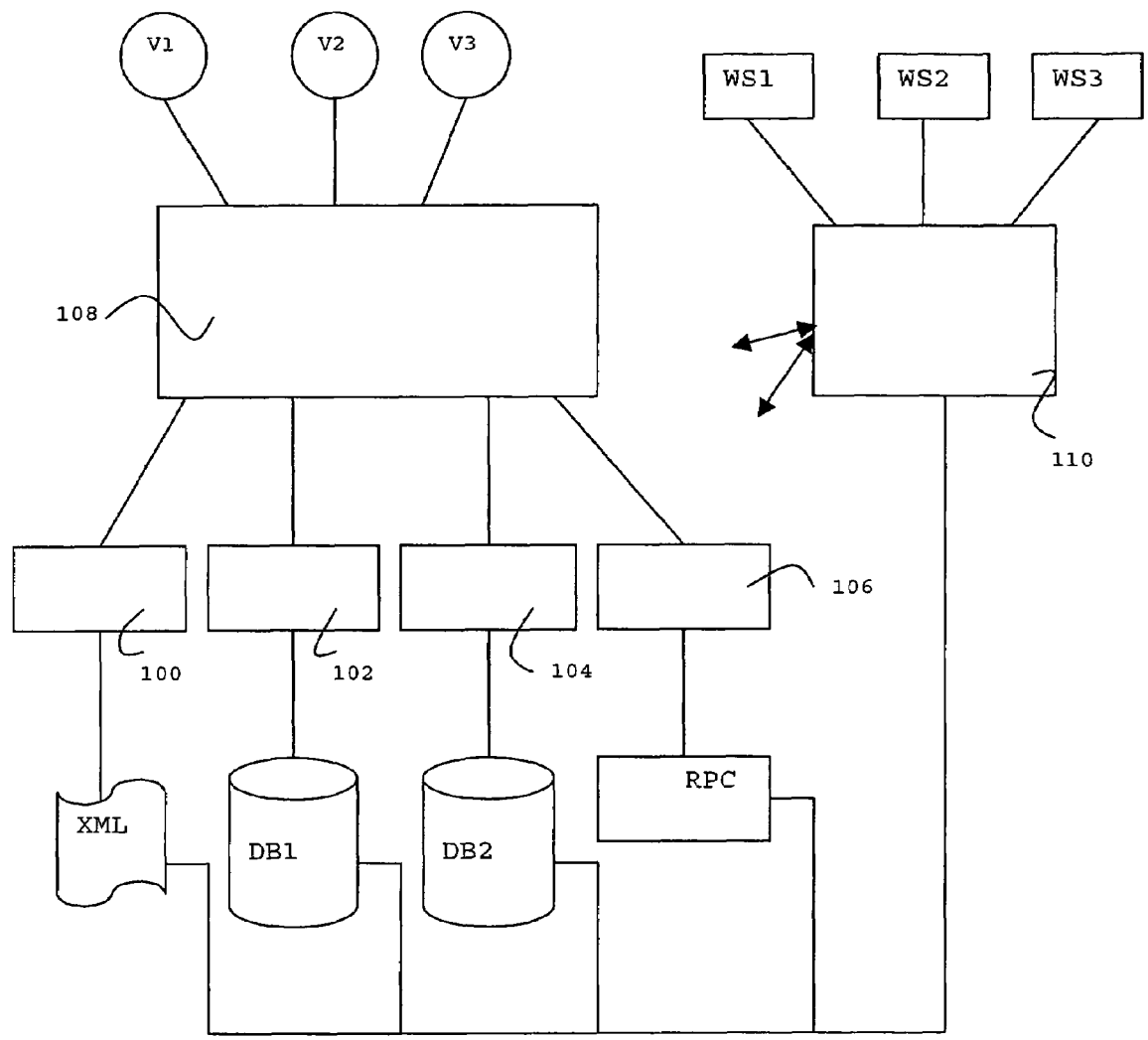
FIG. 1 shows a general view of the enterprise information integration platform.

Content
1. General view of the system
2. Introduction to F-Logic
3. Mapping
3.1. Mapping of databases
3.1.1. Mapping of relational databases to a source ontology
3.2. Adabas mapping
3.2.1. Generic Adabas file access via rule language built-in
3.2.2. Rules for realisation of instance mapping from ontology instances to Adabas instances
3.3. XML Mapping
3.4. Web service mapping
4. External views
5. Publication as web service
6. Answering queries
6.1. Example
6.2. Querying Ontologies
6.2.1. Query Expressiveness
6.2.2. Query Editing Process and Semantic of generated Queries
6.2.3. Query Generation Process
6.2.4. Module Names
6.2.5. Root Class
6.2.6. Datatype Properties
6.2.7. Object Properties 6.2.8. Optional Properties
6.2.9. List-valued Properties
6.2.10. =-Predicates (Equals Predicates)
6.2.11. Other Predicates
6.2.12. Complete example
6.3. Web service Deployment and Execution
6.4. Query Testing
7. Inferencing Appendix A Example Ontology with Adabas Mapping 1. General View of the System FIG. 1 shows a general view of the enterprise information integration platform. Shown are a number of data sources XML, DB1, DB2, and RPC, RPC denoting a remote procedure call and standing for a web service. There is a source ontology 100, 102, 104, and 106 corresponding respectively to every data source. The source ontologies are integrated into an integration ontology 108. The integration ontology and the underlying structures can be accessed via predefined external views V1, V2, and V3. Corresponding to these external views are web services WS1, WS2, and WS3. These web services can be used to input queries into the system. The inference or runtime unit 110 is used for answering the queries. To this end, it translates the queries input via the web services into queries in the query language of the integration ontology 108. Also, it dynamically accesses the ontology structure 100, 102,104, 106, and 108 and the corresponding rules to answer the query. Part of the rules is the mapping between the source ontologies 100, 102,104, and 106 and the individual data sources. These mappings contain built-ins for accessing the data sources. The runtime engine 110, while evaluating the query using the rules, directly accesses the external data sources.

2. Introduction to F-Logic

For the formulation of queries, often the logic language F-Logic is a useful ontology query language (see, e.g., J. Angele, G. Lausen: "Ontologies in F-Logic" in S. Staab, R. Studer (Eds.): Handbook on Ontologies in Information Systems. International Handbooks on Information Systems, Springer, 2003, page 29). In order to gain some intuitive understanding of the functionality of F-Logic, the following example might be of use, which maps the object properties between well-known biblical persons.

First, we define the ontology, i.e. the classes and their hierarchical structure as well as some facts:

abraham:man.
sarah:woman.
isaac:man[fatherIs->abraham; motherIs->sarah].
ishmael:man[fatherIs->abraham; motherIs->hagar: woman].
jacob:man[fatherIs->isaac; motherIs->rebekah:woman].
esau:man[fatherIs->isaac; motherIs->rebekah].

Obviously, some classes are defined: "man" and "woman". E.g., Abraham is a man. The class "man" has the properties "fatherIs" and "motherIs", which are indicating the parents. E.g., the man Isaac has the father Abraham and the mother Sarah. In this particular case, the properties are object properties.

Although F-Logic is suited for defining the class structure of an ontology, nevertheless, in many cases, the ontology languages RDF or OWL are used for these purposes.

Further, some rules are given, defining the dependencies between the classes:

FORALL X,Y X[sonIs->>Y]<-Y:man[fatherIs->X].
FORALL X,Y X[sonIs->>Y]<-Y:man[motherIs->X].
FORALL X,Y X[daughterIs->>Y]<-Y:woman[fatherIs->X].
FORALL X,Y X[daughterIs->>Y]<-Y:woman[motherIs->X].

Rules written using F-Logic consist of a rule header (left side) and a rule body (right side). Thus, the first rule in the example given above means in translation: If Y is a man, whose father was X, then Y is one of the (there might be more than one) sons of X. The simple arrow "->" indicates that, for a given datatype or object property, only one value is possible, whereas the double-headed arrow "->>" indicates that more than one value might be assigned to a datatype or object property.

Finally, we formulate a query, inquiring for all women having a son whose father is Abraham. In other words: With which women did Abraham have a son?

FORALL X,Y<-X:woman[sonIs->>Y[fatherIs->abraham]].

The syntax of a query is similar to the definition of a rule, but the rule header is omitted.

The answer is:
X=sarah
X=hagar

3. Mapping 3.1. Mapping of Databases

For the mapping of databases, a special built-in is defined. This built-in allows the access of the database. It creates e.g. SQL queries to the data of the database. The built-in is incorporated into the mapping rule.

The following example illustrates accessing a database on an MS SQLServer as database type, running on a special computer or port called "host". The database contains a table "Person" containing information on the "Id" of the person, its "name" and its "town". The mapping rule has the form:

X:Person[hasName->Y; livesInTown->Z]<-dbaccess(database,host,Person,f(Id,X,Name,Y,Town,Z)).

3.1.1. Mapping of Relational Databases to a Source Ontology

A relational database consists of a set of tables. Every table consists of a fixed number of named columns. For each column a data type is given. The contents of a table must conform to these data types. For a row in a table a (unique) key may be given identifying one row in an unambiguous way. This key may consist of the values of some columns or may be a separate additional value like a number. Foreign keys define links into other tables; they refer to the keys of other tables and, thus, represent relations or object properties.

The mapping of a relational database to its corresponding source ontology is defined as follows:

Every table is mapped to a class in the ontology.
Every column of a table, which does not represent a foreign key, i.e. which does not represent a relation, is mapped to a datatype property of the corresponding class of the ontology.
Every column which represents a foreign key is mapped to a binary relation or object property of the ontology.
Every row in a table is mapped to an instance of the ontology. The unique identifier of the instance is generated from the key of the row or from all values within the line, if no key is available.
The values within the row are mapped to the mentioned attribute values and the object properties.

The source ontology and the mapping may be generated automatically for the data schema of the relational database in the following way:

The class names are the table names.

The datatype and object property names are the names of the columns.

If there is a primary key, then the unique identifiers for the instances are generated from the database name, the database location, the table name plus the primary key.

If there is no unique key, all the values v1, . . . , vn in a row are used to create a unique key by concatenating the values.

The values of the properties of an instance are directly given by the values in the row.

Relations or object properties are created by the mentioned key transformations of the foreign key.

Let us give an example: The table "person" contains columns "id", "name", "city", "street", "zip", "married". The "id" is the key. The table contains a data entry "1", "Peter", "New York", "King street", "12", "2".

The corresponding source ontology looks like the following (in F-Logic):

Person[
   name=>STRING;
   city=>STRING;
   street=>STRING;
   zip=>NUMBER;
   married=>Person].

The mapping of the table to the concept "Person" is given by the following rule:

f(database,person,X):Person[id->X; name->Y; city->Z; street->U; zip->V; married->W]<-dbaccess(database, person, access(id,X,name,Y,city,Z,street,U,zip,V,married,W)).

The source ontology as well as the mappings from the tables to the source ontology can, thus, be generated automatically.

3.2. Adabas Mapping

We define a mapping from ontologies to Adabas definitions. The Adabas data model is an extension of the relational data model. In addition to table structures it allows also multiple-valued fields and multiple groups of fields, which can again contain multiple fields. Thus it can be considered as an restricted version of the nested relational model (NF2). The nesting is restricted to two levels.

The following table 1 is an Adabas file example:

TABLE 1

Adabas file DDM

| T | L | DB | Name | F | Leng | S | D | Remark |
|---|---|----|------|---|------|---|---|--------|
|   | 1 | AA | PERSONNEL-ID HD=PERSONNEL/ID | A | 8 |   | D |   |
| G | 1 | AB | FULL-NAME |   |   |   |   |   |
|   | 2 | AC | FIRST-NAME | A | 20 | N |   |   |
|   | 2 | AD | MIDDLE-I | A | 1 | N |   |   |
|   | 2 | AD | MIDDLE-NAME | A | 20 | N |   |   |
|   | 2 | AE | NAME | A | 20 |   | D |   |
|   | 1 | AF | MAR-STAT HD=MARITAL/STATUS | A | 1 | F |   |   |
|   | 1 | AG | SEX HD=S/E/X | A | 1 | F |   |   |
|   | 1 | AH | BIRTH HD=DATE/OF/BIRTH EM=99/99/99 | N | 6.0 |   | D |   |
| G | 1 | AI | FULL-ADDRESS |   |   |   |   |   |

TABLE 1-continued

Adabas file DDM

| T | L | DB | Name | F | Leng | S | D | Remark |
|---|---|----|------|---|------|---|---|--------|
| M | 2 | AI | ADDRESS-LINE HD=ADDRESS | A | 20 | N |   |   |
| * |   |    | OCCURENCES 1-6 |   |   |   |   |   |
|   | 2 | AJ | CITY | A | 20 | N | D |   |
|   | 2 | AK | ZIP HD=POSTAL/ADDRESS | A | 10 | N |   |   |
|   | 2 | AK | POST-CODE HD=POSTAL/ADDRESS | A | 10 | N |   |   |
|   | 2 | AL | COUNTRY | A | 3 | N |   |   |
| G | 1 | A2 | TELEPHONE |   |   |   |   |   |
|   | 2 | AN | AREA-CODE HD=AREA/CODE | A | 6 | N |   |   |
|   | 2 | AM | PHONE HD=TELEPHONE | A | 15 | N |   |   |

The Adabas mapping consists of the following parts:

Ontology definitions, which represent a specific Adabas nested table structure as closely as possible.

A single generic rule-language built-in, which allows to access all Adabas instances.

A set of rules, which maps each ontology class definition to the generic Adabas built-in.

Adabas schema definitions are automatically mapped according to the following definitions to equivalent ontology schema definitions.

An Adabas nested table is mapped to a class.

The single-valued and multiple fields are mapped to data type properties of that class, with a corresponding multiplicity.

Multiple groups of fields are mapped to an additional ontology class with an object property. This class again has data type properties, which can be multiple. However this class does not have an object property.

The support for all atomic XML schema datatypes is part of the ontology language. The Adabas type system has the following datatypes. They are mapped to the specified XML schema datatypes of the ontology:

Alpha (A)-xs:string
Fixed (F)-xs:decimal
Packed(P)-xs:decimal
Unpacked(U)-xs:decimal
Binary(B)-xs:hexBinary
Float (G)-xs:double The ontology class definitions are derived from the Adabas DDM definitions and are, therefore, containing only the long field names. For the above Adabas DDM the following ontology class definition is automatically generated:

Personnel[
   #personnelid=>xsd#STRING;
   #firstname=>xsd#STRING;
   #middlename=>xsd#STRING;
   #name=>xsd#STRING;
   #marstat=>xsd#STRING;
   #sex=>xsd#STRING;
   #birth0>xsd#DATE;
   #address-line=>>xsd#STRING;
   #city=>>xsd#STRING;
   #zip=>>xsd#STRING;

```
        #postcode=>>xsd#DATE;
        #country=>>xsd#STRING;
        #areacode>xsd#DATE;
        #phone=>xsd#STRING;
    ].
```

3.2.1. Generic Adabas File Access Via Rule Language Built-in

The generic Adabas built-in has the following interface. It uses only the Adabas short names for accessing the instances.

```
adaaccess(
    "<adabasFileNumber>",
    F(ISN, "<adabasShortname1>", X1,
        "<adabasShortname2>", X2 , . . . ,
                "<adabasShortnameN>", Xn),
    "adabasDBID")
```

3.2.2. Rules for Realisation of Instance Mapping from Ontology Instances to Adabas Instances For each ontology class definition representing an Adabas file a set of rules are generated, which map those class definitions to an invocation of the generic Adabas built-in. The rules also stand for the mapping form the long DDM field names to the Adabas short names. The rules have the following form:

```
FORALL VAR0, VAR1, VAR2, ..., VARN (
id("http://mynamespace.org"#longAdabasFileName, VAR0):
    "http://mynamespace.org"#longAdabasFileName
    ["http://mynamespace.org"#longAadabasFieldName1-->>VAR1;
     "http://mynamespace.org"#longAadabasFieldName2-->>VAR2;
       . . . .
     "http://mynamespace.org"#longAdabasFieldNameN-->>VARN]
<-
( adaaccess("adabasFileNumber",
    F(VAR0,
      "adabasShortName1",VAR1,"adabasShortName2",VAR2,
      . . .
      "adabasShortNameN",VARN),
    "adabasDBID")
```

Appendix A contains an example ontology with a corresponding Adabas mapping.

The ontologies, mappings and other rules are preferably stored as oxml-files.

The source ontologies always have to be "complete", i.e. they have to contain a construct for every parameter or construct of the underlying data source or web service. Otherwise, certain data would not be accessible.

For the integration ontology, this does not necessarily have to be the case. It is sufficient, if the integration ontology contains the constructs of interest.

3.3. XML Mapping

A mapping is needed between XML instances and F-Logic instances or constructs of the source ontologies.

For a XML documents a XML schema can be generated, which contains the data type definitions of the data contained in the XML document. Using such an XML schema, the corresponding XML document can be validated, i.e. the data in the document can be checked under the aspect, whether they conform to the correct data type. The validation process generates an annotated version of the XML document, containing for every data or XML instance a PSVI instance (PSVI=post schema validation info set), which is a reference to the suitable data type from the XML schema. The PSVI instance contains information on the data type of the XML instance.

We consider XML instances with XML Schema, which have fixed schema at design time. XML instances are given with PSVI instances, which annotate type information and abstracts from the concrete lexical XML representation.

The mapping should preserve as much as possible information. However it is acceptable, if some information is lost, because the effort to preserve this is too high, e.g.

- Constraints of complex content models via nested sequence, choice or all model groups.
- MinOccurs and MaxOccurs constraints with other cardinality as 0, 1 and unbounded.

XML Schema features like wildcards, which do not provide any schematic information, are not supported.

There is a schema-driven mapping of XML element nodes with associated XML schema constructs to ontology instances and schema.

The mapping is defined as follows:

- XML element declarations of simpleContent are mapped to a property definition of the ontology for a property of a datatype (like columns from tables).
- XML complexType definitions are mapped to ontology class definitions.
- XML element declarations of complexType are mapped to an object property definition of the ontology.

Figure 2:
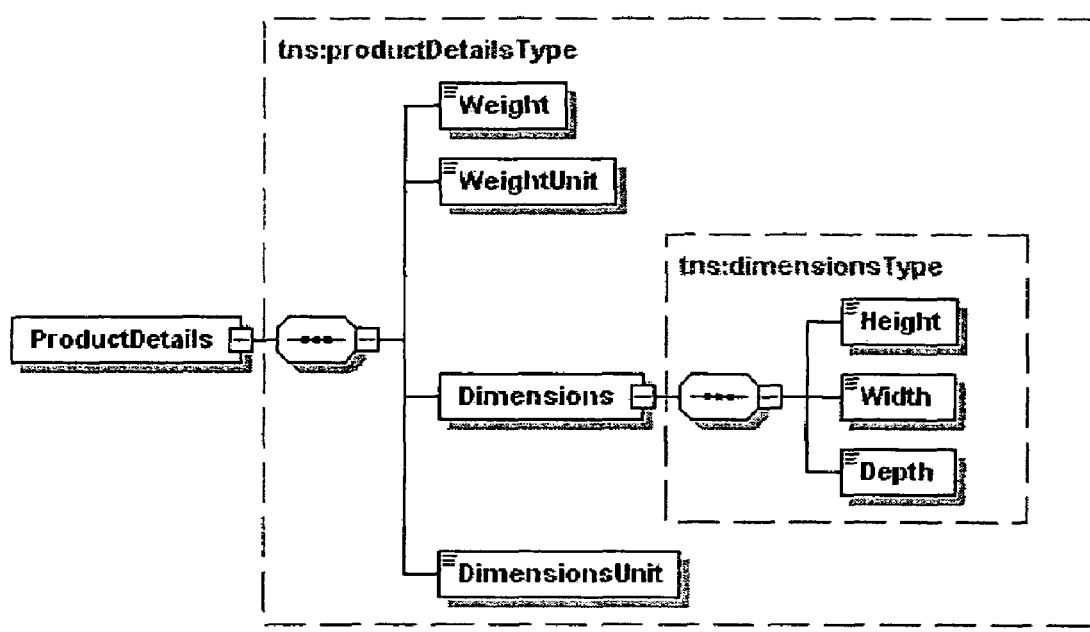
FIG. 2 shows an exemplary data structure.

The mapping is illustrated by the following example. The XML schema of the example is illustrated in FIG. 2.

```
<xs:schema elementFormDefault="qualified"
targetNamespace="http://www.ws-i.org/SampleApplications/SupplyChainManagement/2003-07/Catalog.xsd"
xmlns:tns="http://www.ws-i.org/SampleApplications/SupplyChainManagement/2003-07/Catalog.xsd"
xmlns:xs="http://www.w3.org/2001/XMLSchema"
>
    <xs:element name="ProductDetails" type="tns:productDetailsType"/>
    <xs:complexType name="productDetailsType">
        <xs:sequence>
            <xs:element name="Weight" type="xs:int"/>
            <xs:element name="WeightUnit" type="xs:string"/>
            <xs:element name="Dimensions" type="tns:dimensionsType"/>
            <xs:element name="DimensionsUnit" type="xs:string"/>
        </xs:sequence>
    </xs:complexType>
```

-continued

```
    <xs:complexType name="dimensionsType">
        <xs:sequence>
            <xs:element name="Height" type="xs:int"/>
            <xs:element name="Width" type="xs:int"/>
            <xs:element name="Depth" type="xs:int"/>
        </xs:sequence>
    </xs:complexType>
</xs:schema>
```

It follows an example XML document, which fits to the schema.

```
<ProductDetails xmlns="http://www.ws-i.org/SampleApplications/SupplyChainManagement/2003-07/Catalog.xsd"
xmlns:xsi="http://www.w3.org/2001/XMLSchema-instance" xsi:schemaLocation="http://www.ws-
i.org/SampleApplications/SupplyChainManagement/2003-07/Catalog.xsd
Catalog.xsd">
    <Weight>24</Weight>
    <WeightUnit>pounds</WeightUnit>
    <Dimensions>
        <Height>24</Height>
        <Width>21</Width>
        <Depth>26</Depth>
    </Dimensions>
    <DimensionsUnit>inches</DimensionsUnit>
</ProductDetails>
```

For this XML schema with simple and complexType element declarations the following ontology is generated—expressed in the language F-Logic for this example:

```
<ns
    ontons="http://www.ws-
i.org/SampleApplications/SupplyChainManagement/2003-
07/Catalog.xsd"
        ontons:odt="http://schema.ontoprise.com/datatypes"
        ontons:xsd="http://www.w3.org/2001/XMLSchema"
>
// ONTOLOGY_METADATA -------------------
// CONCEPTS -------------------
#productDetailsType::#DEFAULT_ROOT_CONCEPT.
#dimensionsType::#DEFAULT_ROOT_CONCEPT.
#productDetailsType[#Weight=>xsd#INTEGER;
    #WeightUnit=>xsd#STRING;
    #Dimensions=>>#dimensionsType;
    #DimensionsUnit=>xsd#STRING].
#dimensionsType[#Height=>xsd#INTEGER;
    #Width=>xsd#INTEGER;
    #Depth=>xsd#STRING].
</ns>
```

Here "#Dimensions=>>#dimensionsType" represents the object property to the class "dimensionsType" needed for the mapping of the XML complexType "dimensionsType".

For the example XML document the automatic mapping process will generate the following ontology instances:

```
<ns
    ontons="http://www.ws-
i.org/SampleApplications/SupplyChainManagement/2003-
07/Catalog.xsd"
        ontons:odt="http://schema.ontoprise.com/datatypes"
        ontons:xsd="http://www.w3.org/2001/XMLSchema"
>
```

-continued

```
// INSTANCES -------------------
#instance2productDetailsType:#productDetailsType.
#instance2productDetailsType[#Weight->>"24,6";
    #WeightUnit->>"pounds";
    #Dimensions->>#instance4dimenstionsType;
    #DimensionsUnit->>"inches"].
#instance4dimensionsType:#dimensionsType.
#instance4dimensionsType[#Width->>24.0;
    #Depth->>21.0;
    #Height->>26.0].
</ns>
```

This is done by a generic built-in, which has the XML Schema information and its mapping to ontology definitions as input. By accessing the XML instances this built-in has, therefore, all the information to construct the corresponding ontology instances given as variables with ontology schema information. This is done according to the schema-driven mapping specified above.

Based on this generic XML built-in the mapping is realized by generated F-Logic mapping rules, which map the generated ontology classes and properties to the corresponding XML constructs with the help of this XML built-in. The following is an example of such a generated rule:

```
FORALL VAR0, VAR1, VAR2, VAR3, VAR4 (
id("productDetailsType", VAR0):
    #productDetailsType[
        #Weight ->> VAR1;
        #WeightUnit ->> VAR2;
        #Dimensions ->> VAR3;
        #DimensionsUnit ->> VAR4]
```

```
<-
XMLBuiltin("datasource-URL",VAR0
    "XMLSchemaDefiniton","MappingToOntology",
        F(VAR1,VAR2,VAR3,VAR4))
```

This built-in generates XQueries. The XML results of the XQueries are mapped to ontology instances according to this rule.

3.4. Web Service Mapping

Web services can be considered as remote procedure call (RPC) with a list of input parameters and a list of output parameters, which contain the result.

E. g. a web service who delivers the current temperature of a city may have as input parameter the zip code and as output parameter the temperature. A corresponding source ontology would have a class "place" with two properties: "zip code" and "temperature".

We consider only document style web services where all input parameters are contained in a single XML element of the input message and all output parameters in a single XML element of the output message. The XML elements are described by XML schema definitions. The Web services are described by WSDL (web service description language), which references XML schema definitions.

The web service mapping is defined as follows:

A web service operation is mapped to an ontology class.

The element of the input message and the element of the output message are mapped to object properties.

The content of the input and output messages are mapped to ontology definitions like specified in the XML mapping above.

The following example defines a web service getProductDetails, which uses elements of the same schema we used in the description of the XML mapping.

```
<wsdl:definitions xmlns:xs="http://www.w3.org/2001/XMLSchema" xmlns:wsi="http://ws-i.org/schemas/conformanceClaim/"
    xmlns:wsdl="http://schemas.xmlsoap.org/wsdl/" xmlns:cat="http://www.ws-
    i.org/SampleApplicalions/SupplyChainManagement/2003-07/Catalog.xsd" xmlns:tns="http://www.ws-
    i.org/SampleApplications/SupplyChainManagement/2003-07/Catalog.wsdl"
    xmlns:soap="http://schemas.xmlsoap.org/wsdl/soap/" targetNamespace="http://www.ws-
    i.org/SampleApplications/SupplyChainManagement/2003-07/Catalog.wsdl">
    <wsdl:types>
        <xs:schema xmlns:xs="http://www.w3.org/2001/XMLSchema">
            <xs:import namespace="http://www.ws-i.org/SampleApplications/SupplyChainManagement/2003-
07/Catalog.xsd" schemaLocation="Catalog.xsd"/>
            <xs:element name="ProductNumber" type="xs:integer"/>
        </xs:schema>
    </wsdl:types>
    <wsdl:message name="getProductDetailsRequest">
        <wsdl:part name="request" element="ProductNumber"/>
    </wsdl:message>
    <wsdl:message name="getProductDetailsResponse">
        <wsdl:part name="Body" element="cat:ProductDetails"/>
    </wsdl:message>
    <wsdl:portType name="CatalogPortType">
        <wsdl:operation name="getProductDetails">
            <wsdl:input name="getDetailsRequest" message="tns:getProductDetailsRequest"/>
            <wsdl:output name="getDetailsResponse" message="tns:getProductDetailsResponse"/>
        </wsdl:operation>
    </wsdl:portType>
    <wsdl:binding name="CatalogSoapBinding" type="tns:CatalogPortType">
        <soap:binding style="document" transport="http://schemas.xmlsoap.org/soap/http"/>
        <wsdl:operation name="getProductDetails">
            <soap:operation/>
            <wsdl:input>
                <soap:body parts="request" use="literal"/>
            </wsdl:input>
            <wsdl:output>
                <soap:body parts="Body" use="literal"/>
            </wsdl:output>
        </wsdl:operation>
</wsdl:definitions>
The web service mapping will result in the following ontology
definitions.
// Ontology
<ns
    ontons="http://www.ws-i.org/SampleApplications/SupplyChainManagement/2003-07/Catalog.xsd"
    ontons:odt="http://schema.ontoprise.com/datatypes"
    ontons:xsd="http://www.w3.org/2001/XMLSchema"
>
// ONTOLOGY_METADATA --------------------
// CLASSES--------------------
#getProductDetailsOperation::#DEFAULT_ROOT_CONCEPT.
#productDetailsType::#DEFAULT_ROOT_CONCEPT.
#dimensionsType::#DEFAULT_ROOT_CONCEPT.
#getProductDetailsType::#DEFAULT_ROOT_CONCEPT.
// PROPERTIES --------------------
#getProductDetailsOperation[
    #ProductNumber=>#ProductNumberType;
```

```
    #ProductDetails=>#productDetailsType].
#productDetailsType[#Weight=>xsd#INTEGER;
    #WeightUnit=>xsd#STRING;
    #Dimensions=>>#dimensionsType;
    #DimensionsUnit=>xsd#STRING].
#dimensionsType[#Height=>xsd#INTEGER;
    #Width=>xsd#INTEGER;
    #Depth=>xsd#STRING].
```

The following is an example SOAP request according to the given WSDL definitions. SOAP stands for "Simple Object Access Protocol"; it is a lightweight XML-based messaging protocol used to encode the information in Web service request and response messages before sending them over a network.

```
Input message:
<SOAP-ENV:Envelope xmlns:SOAP-ENV="http://schemas.xmlsoap.org/soap/envelope/">
<SOAP-ENV:Body>
    <ProductNumber xmlns="http://www.ws-i.org/SampleApplications/SupplyChainManagement/2003-07/Catalog.xsd">
        60500
    </ProductNumber>
</SOAP-ENV:Body>
</SOAP-ENV:Envelope>
Output Message:
<SOAP-ENV:Envelope xmlns:SOAP-ENV="http://schemas.xmlsoap.org/soap/envelope/">
<SOAP-ENV:Body>
<ProductDetails xmlns="http://www.ws-i.org/SampleApplications/SupplyChainManagement/2003-07/Catalog.xsd">
    <Weight>24.6</Weight>
    <WeightUnit>pounds</WeightUnit>
    <Dimensions>
        <Height>26</Height>
        <Width>24</Width>
        <Depth>21</Depth>
    </Dimensions>
    <DimensionUnit>inches</DimensionUnit>
</ProductDetails>
</SOAP-ENV:Body>
</SOAP-ENV:Envelope>
```

The web service mapping maps this SOAP request of the web service above to the following ontology instances. Please note that only the first instance is special to the web service mapping. All other instances are the same as in the XML mapping example.

```
#instance1GetProductDetailsOperation:#getProductDetailsOperation.
#instance1GetProductDetailsOperation[#ProductNumber->>605001;
    #ProductDetails->>#instance2productDetailsType].
#instance2productDetailsType:#productDetailsType.
#instance2productDetailsType[#Weight->>"24,6";
    #WeightUnit->>"pounds";
    #Dimensions->>#instance4dimenstionsType;
    #DimensionsUnit->>"inches"].
#instance4dimenstionsType:#dimensionsType.
#instance4dimenstionsType[#Width->>24.0;
    #Depth->>21.0;
    #Height->>26.0].
</ns>
```

A generic built-in "webservice" realizes the transformation of the corresponding SOAP request to the ontology instances according to the mapping specified above. The built-in gets the WSDL description and its mapping to ontology definitions as input. From that it constructs ontology instances from the result of the SOAP request.

Based on this generic web service built-in the mapping is realized by generated F-Logic mapping rules, which map the generated ontology classes and properties to this web service built-in. The following is an example of such a generated rule:

```
FORALL PN,PD
    getProductDetailsOperation(PN):getProductDetailsOperation
        [ProductNumber->PN; ProductDetails->PD]
    <- webservice("http://www.example.com/Products",
        input("ProductNumber",PN),
        output("ProductDetails",PD))
```

4. External Views

Different external views on the integrated data can be defined by specifying predefined queries. They can be understood as predefined parameterized queries posed to the integration ontology and formulated in the query language of the integration ontology.

5. Publication as Web Service

For every external view a corresponding web service access of the system can be defined, which allows the corresponding querying of the system. Such web services take—in the most general case—an XML document as input and generate an XML document as output or answer. Such web services are called "document style web services".

So, e.g., an input XML document might look like

```
<Name>
    Rebekah
</Name>
```

An output might look like

```
<Children>
    <Son> Jacob </Son>
    <Son> Esau </Son>
</Children>
```

A more detailed explanation will be given below.

6. Answering Queries

The following example illustrates how the system works to determine the temperature of the place a certain person is living in. The temperature can be accessed via a web service, while the person is stored in a database.

The system contains a web service "temperature", giving the current temperature of a place, if the zip code is given as input. The web service built-in is webservice(<uri>,<input>,<output>)

<uri> denotes the location of the web service within the internet. <input> in this example is the zip code. <output> in this example is the temperature in degrees Celcius. The mapping of the database onto the class "person" is done in the following way:

FORALL X,Y,Z    X:Person[hasName->Y; hasZipCode->Z]<-dbaccess("MS SQL", "Person",F(id,X,name,Y,zip,Z)).

dbaccess is a built-in. This rule guarantees the mapping between the database and the source ontology as usual. For mapping the web service, we define the following rule:

FORALL X,Z,T    X[hasTemperature->T]<-X:Person[hasZipCode->Z] and webservice("http://a.b.c/temperature",Z,T)

with the built-in "webservice". The following query gives the temperature at the place of living for all persons:

FORALL X,T,N<-X:Person[hasName->N; hasTemperature->T].

6.1. Example

Let us consider how a query posed on the web service input level will be transferred to the web service data source level. We will, again, consider the above given example of the web service getProductDetails.

The system may present a browser interface for inputting the product number, e.g. 123. This browser front end is based on a document style web service. The query is translated by the inference engine into a query in the query language of the integration ontology as follows (in F-Logic):

Forall X,Y,Z,U<-X:getProductDetails[ProductNumber->123; getProductDetails->Y[Weight->Z; WeightUnit->U]].

implying a suitable integration ontology. If, for simplicity reasons of this example, we assume that the source ontology is identical to the integration ontology, we then have to map the ontology onto the document style web service that returns product details. The mapping rule has to create the XML input of the web service and, at the same time, define the mapping of the output XML document to the ontology. Such a rule might look like:

```
Forall X,Y,Z,U
    X:getProductDetailsOperation[
        Product Number -> Y; getProductDetails ->
            [Weight -> Z; WeightUnit -> U]
    <-
    x:getProductDetailsOperation[
        ProductNumber -> Y] and
    wsaccess("http://a.b.c/products/",
        "<ProductNumber>" + Y + "</ProductNumber>",
        <ProductDetails>
            <Weight> + Z + </Weight>
            <WeightUnit> + U + </WeightUnit>
        </ProductDetails>)
```

For the input and output XML documents variables can be defined which are constructed dynamically when answering a query.

The answer (e.g. 60 kg, i.e. Z=60 and U=kg) can then passed to the higher levels and displayed in an output browser front end.

6.2. Querying Ontologies

In the preferred embodiment, by means of built-in functions and F-Logic rules, the system describes source ontologies and integration ontologies. The system needs to provide a query mechanism to allow for retrieval of data that is described by such ontologies.

Rule languages can be used for this. Rules that do not have a rule head return all variable bindings for the rule body that evaluate to a valid result. It is not inherently necessary that the rule language is also used as a query language. But having the same language and its implementation for describing and for querying data avoids many possible conflicts with data type processing and semantics of operations.

6.2.1. Query Expressiveness

Rules in predicate logic, in particular F-Logic, can describe properties of data objects as well as relations between data objects (object properties). For example a rule describing a logical property is: "If X is a German taxi, then X's colour is light ivory". Examples for describing structural relationships are "is SonOf", "hasSons". An inference engine derives those combinations of objects where beside logical conditions also structural relationships hold that have been specified in a query.

Because integrated data as described in integration ontologies shall be supplied for applications in web services, some additional considerations are necessary.

When using web services as interface to an integration ontology, users expect that a web service returns web service style results, that is a single XML document which comprises all structural relationships.

Example:

Query for all men that have at least one child with "rebekah" return the list of children:

FORALL X, Y<-X:man[sonIs->>Y] and Y[motherIs->rebekah].

While the inference engine returns two results:

X=isaac Y=jacob

X=isaac Y=esau a web service should typically return a nested structure of XML objects:

```
<man="isaac">
    <sonIs name="jacob"/>
    <sonIs name="esau"/>
</man>
```

An inference engine returns all variable bindings that lead to a valid result with respect to conditions that are specified in the query. Only if there is a binding for all variables, a result will be returned. Special query formulations are needed to express "give all information that is available".

Example:

Return a list of all women and their mothers:

FORALL X, Y<-X:woman[motherIs->Y].

The inference engine does not return any result because there is no information about mothers of women in the data, i.e. there is no binding for Y. Nevertheless an application might be interested in the list of women that exist in the data {sarah, hagar, rebekah}.

For exposure of query functionality in web services it is essential that these queries can be parameterized, i.e. concrete values for query predicates will not be specified before execution time of a web service.

6.2.2. Query Editing Process and Semantic of Generated Queries

The system preferably hides details about the ontology and query language. Therefore, it needs a query editor which allows for language independent specification of queries.

The system's query editor starts from one selected class. It recursively allows for navigation along relations or object properties to further classes. This process spans a hierarchical structure (called tree) of class nodes with relations or object properties as connections. For each class node in the tree it is possible to specify restrictions and projections.

The current query editor implements generation of queries for one specific restriction and projection semantics as described below. Actually, other semantics are conceivable and can be implemented.

The Query Editor shows each class in the tree in a separate window pane. These panes are divided into three parts:

General Information (Id: name of query, Namespace: namespace of query object)

Datatype properties

Object properties (relations)

The last two will now be explained in more detail.

The datatype properties part lists all datatype properties of a class. For each property one can choose whether this property shall be projected, i.e. be part of the query output or not.

Independent of the projection, you can optionally specify restriction clauses. A list box shows the possible types of restrictions (e.g. =, >, >=, <, <=, contains, startswith, !=, not contains, not startswith). In a textbox one can specify a value for the restriction. If one does not want to use a constant value but leave it to the application to specify the value when executing the query, then one can define a so-called "external variable". A value in the text box denotes an external variable, if the value is a string starting and ending with a $-character. It is possible to use the same external variable in different places of the query, even in different class nodes.

A query only returns a result instance of a class, if there is at least one datatype property value which fulfils the specified restriction. As a consequence, if you have restrictions on multiple datatype properties, they all need at least one matching value; otherwise the object will be discarded.

Only those datatype property values will be returned that fulfil the restriction. That means, if a datatype property is a list-valued property, those values, that do not match the restriction, will not appear in the query result.

The relations or object properties part lists all object properties of a class. When clicking on an object reference button, a new pane with a description of the referenced class will be opened. Query definition continues recursively for this class.

The current object only belongs to the query result, if for each referenced class that has one or more restrictions (itself or its descendents) there is at least one referenced object that satisfies these restrictions. As a consequence, if you have restrictions on multiple object properties, they all need a matching value; otherwise the object will be discarded.

If there is any restriction on datatype properties of the referenced class or one of its descendents, then only those objects appear in the result that satisfy these restrictions. It is possible to repeatedly use the same object reference (simulate some restricted forms of "or"-operations on the referenced class, nevertheless there must be at least one match for all of these references).

6.2.3. Query Generation Process

The system uses an internal data structure to describe a query as specified in the query editor. This internal data structure will be used for further processing steps:

Generation of a web service description in a WSDL (Web Service Description Language) in case the described query shall be exported as a web service.

Generation of the query itself in a given query language (e.g. F-Logic).

Instances of this internal data structure can also be stored persistently. Storing such an internal data structure allows for reuse and further development after system restart.

Queries to be generated need to support expressiveness as described in a previous section. Also, generated queries do implement semantics as described in the previous section.

6.2.4. Module Names

Knowledge about objects and their content can be spread across various modules and object references can span objects in independent ontologies having different namespaces and module names.

Therefore, queries cannot make any static assumptions about the modules where statements about objects, classes etc. are made. As a consequence, the system has to treat all module name information as unknown and potentially being different for all assertions.

For queries being generated this means that for every predicate like

X:classname@module_variable,

X[property_name->>Y]@module_variable the system uses different variables at each place, where a module has to be specified.

6.2.5. Root Class

As a starting point for every query the system needs a variable that is bound to instances of a query's root class, i.e. the class where the query definition started. The predicate for this looks like:

rootclass_variable:classname@module_variable

In addition the query generation creates a result projection, i.e. it defines a frame for the description of the result output for qualified objects. In F-Logic this frame is:

```
FORALL XRESULTVAR <- EXISTS ...
  unify(XRESULTVAR,
    result(classname,
      rootclass_variable,
      [ content_description    ])).
  orderedby XRESULTVAR
```

"XRESULTVAR" is the name of the output variable. That means, in the end this variable will be bound to F-Logic terms that contain the description of the query result objects.

"classname" is the name of the root class.

"rootclass_variable" is the variable that is used in the root class predicate to denote the object of the root class.

"content_description" is a list of projections to be generated for the root object's properties that shall appear in the query result objects.

Every F-Logic query ends with a dot. Per default F-Logic queries return all variable bindings that led to a valid result. This typically leads to very many duplicates, e.g. every single member in a list is a valid binding for a list member variable when constructing this list.

To reduce the output volume and because applications are only interested in the projection as generated for the root element, the system uses an "orderedby" extension of the used F-Logic query language. "orderedby" is not direct part of F-Logic, instead it is to be appended after the dot. "orderedby" can be followed by one or more variable names, indicating which variables shall appear in the result tuples in which order.

6.2.6. Datatype Properties

For datatype properties that need to be bound to a variable, the system generates predicates like:

X [property_name->>property_variable]@module_variable.

For all properties to be shown in a query result a property term can be found. For datatype properties this property term looks as follows:

```
property(property_name,
  property_datatype,
  property_variable,
  [])
```

"property_name" is the name as defined in the ontology of the datatype property to be shown.

"property_datatype" is the type of that property as defined in the ontology. As the used datatypes generally are the same datatypes as those defined for XML schema datatypes, these names have the namespace "http://www.w3.org/2001/XMLSchema".

"property_variable" is the variable that is used in the property predicate to denote the values of the used property.

Because datatype properties have no child objects, these properties have an empty child property list ("[]")

6.2.7. Object Properties

For object properties that are used to navigate from one class to the referenced class, the system generates predicates like:

X[property_name->>property_variable]@modulevariable.

For all properties to be shown in the query result a property-term can be found. For object properties this property term looks as follows:

```
property(property_name,
  class_name,
  property_variable,
  [...]
)
```

"property_name" is the name as defined in the ontology of the object property to be shown.

"class_name" is the type of that property as defined in the ontology. It is the name of the class of the referenced objects.

"property_variable" is the variable that is used in the property predicate to denote the values of the used property.

Because object properties only appear in the result if there is at least one child object to be projected or if there is at least one of the object's datatype properties to be returned, they never have an empty list of children which are to be described in the fourth property component ("[ . . . ]").

If the same property has been used independently more than once (independent references via the same object property), then the property_name itself is not sufficient to describe which reference has been used to reference a result object. In these cases, the property_names will get an appendix making each reference unique ("_"+sequence number). This has to be in sync with the WSDL schema generation (see below).

6.2.8. Optional Properties

F-Logic as a logic programming language returns all variable bindings that lead to a valid query result. To be valid, all variables need a value binding. If a variable cannot be bound with a value, then the other bindings are negligible and do not contribute to the query result.

However, in an integration scenario, users want to query objects and receive all available information and they do not want to care about non-existing values. This has to be handled explicitly.

This is only possible if the system generates null value representations (from an F-Logic perspective these are normal values). For chosen null value representation(s) see below. In addition the system has to generate predicates that distinguish between given values and the situation where no value is given. The type of predicates to be generated here are:

```
(((not EXISTS VAR1, VAR2 X[property_name->>VAR1]@VAR2)
    and (equal(module_variable,NULLVALUE))
    and (equal(property_variable,NULLVALUE)))
  or (X[property_name-
>>property_variable]@module_variable))
```

"X" denotes an already bound variable.

"property_name" is the optional property which is handled here.

"VAR1" and "VAR2" are local variables just to check whether the property exists or not. "VAR2" is only for the module name.

If the property in question does not exist, then the two subsequent equal predicates bind the value "NULLVALUE" to the two global variables for the property predicates. After having evaluated this complex predicate, the variables "module_variable" and "property_variable" are either bound to the existing value or to the null value representation.

6.2.9. List-Valued Properties

When a datatype or object property is to be assigned to a variable (e.g. X[property_name->>property_variable]@module-variable)

then only single values are bound to that variable at a time. The F-Logic evaluation processes predicates on these bindings individually for each value. This is of course expected for single valued properties but it also holds for list valued properties.

As already explained in section "expressiveness" users expect XML documents with lists of related child objects and they do not want to have separate XML documents for every individual child object (which would lead to high redundancy because the whole hierarchy from root to parent of child is duplicated, and a sort of Cartesian product shows up, if a parent has more than one list-valued property in the result).

Therefore, F-Logic's list-built-in is used to generate child lists. To ensure that lists are built for every parent node individually the system has to generate a key for each list first. The template for this key generation is:

```
unify(listkey_variable,
      ID(list of object ids))
```

"listkey_variable" is a variable that takes the key value.
"list of object ids" is the ordered list of all object identifiers from root object to current object, which has the property for which the new list is to be created.

Once this key is described, the system can generate the list itself:

```
list(listkey_variable,
     property_description,
     list_variable).
```

"listkey_variable" is the list key as explained above.
"list_variable" is a variable that will store the list to be constructed.
"property_description" contains the specification of how list entries should look like. For details see sections "Datatype properties" and "Object Properties", which describe how datatype and object properties are shown in the query result.

6.2.10. =-Predicates (Equals Predicates)

In case a user specifies an =-comparison on a datatype property and at the same time this property shall be part of the query result (shown), then the system needs a variable for that property in order to move the value as bound to that variable into the query result. In this scenario F-Logic provides two semantically different ways to express some kind of equality for datatype properties:

X[attr->>val] and X[attr->>Y]:

This means that X shall have at least one datatype property named "attr" with value "val" and (if yes) bind all existing values (one at a time) to variable Y.

X[attr->Y] and equal(Y, val):

This means that variable Y shall be bound with all existing values (one at a time) and then we filter out all Y that have value "val".

For correct invocation of the web service built-in, we need to use the first formulation. For correct query processing with respect to our specification in section "Datatype Properties", we need to have the second formulation. Therefore, if a user specifies a query with an =-comparison on a datatype property named "attr" with value "val", we generate the following type of predicate:

X[attr->>Y] and X[attr->>val] and equal(Y,val)

In case that the property shall not belong to the query output, it is sufficient to have the X[attr->>val] predicate, because then the system only needs to check that there is at least one such value.

6.2.11. Other Predicates

While =-comparison can be expressed directly via unification with X[attr->>val] this is not possible for other predicates. These will be processed in built-in functions. Here it is necessary to generate the following style of predicates:

X[attr->>Y] and builtin(Y, val).

The first part binds all values to Y, the second filters those Y that satisfy the built-in, e.g. greater, greaterorequal, contains, startswith, etc.

This is exactly the semantics that we have for =-comparison with the equal(..) filter. Another semantics could have been defined, for example: test whether there is a value that fulfills the condition and if at least one such value exists, then return all values. This had been easy for the =-comparison (X[attr->>val] and X[attr->>Y]). For all other predicates this would be more complex (EXISTS Z X[attr->>Z] and builtin(Z, val) and X[attr->>Y]).

6.2.12. Complete Example

It follows one complete query containing:
A =-comparison with external variable "var" on property to be shown in result.
a constant =-comparison ("egon") on property not to be shown in result.
projection of list valued properties.
list valued object/datatype properties.
list-valued optional properties in projection.

```
FORALL XRESULTVAR <-
EXISTS EII_class2_0,
            EII_class1_op11_0,
            EII_class1_dp0nint_0,
            EII_MVN_0,
            EII_class1_LISTKEY_0,
            EII_class1_LIST_0,
            EII_class1_dp11int_0,
            EII_MVN_2,
            EII_MVN_3,
            EII_MVN_4,
            EII_MVN_5
    unify(XRESULTVAR,
            result("http://test.ns"#class2,
                EII_class2_0,
                [property("http://test.ns"#op11,
                    "http://test.ns"#class1,
                    EII_class1_op11_0,
                    [EII_class1_LIST_0,
                        property("http://test.ns"#dp11int,
"http://www.w3.org/2001/XMLSchema"#integer,
                            EII_class1_dp11int_0,[])
                    ])
            ]))
```

-continued

```
    and (EII_class2_0:"http://test.ns"#class2@EII_MVN_5)
    and (EII_class2_0["http://test.ns"#op11->>
        EII_class1_op11_0]@EII_MVN_4)
    and (((((not EXISTS EII_class1_dp0nint_1, EII_MVN_1
        EII_class1_op11_0["http://test.ns"#dp0nint-
>>EII_class1_dp0nint_1]@EII_MVN_1))
            and (equal(EII_class1_dp0nint_0,NULLVALUE))
            and (equal(EII_MVN_0,NULLVALUE)))
        or (EII_class1_op11_0["http://test.ns"#dp0nint-
>>EII_class1_dp0nint_0]@EII_MVN_0)))
        and (unify(EII_class1_LISTKEY_0,
                ID(EII_class2_0,EII_class1_op11_0)))
        and (list(EII_class1_LISTKEY_0,
                property("http://test.ns"#dp0nint,
                    "http://www.w3.org/2001/XMLSchema"#integer,
                    EII_class1_dp0nint_0,[]),
                EII_class1_LIST_0))
    and (EII_class1_op11_0["http://test.ns"#dp11int-
>>EII_class1_dp11int_0]@EII_MVN_2)
    and (EII_class1_op11_0["http://test.ns"#dp11int->><parameter
ref='var'/>]@EII_MVN_2)
    and (equal(EII_class1_dp11int_0,<parameter ref='var'/>))
    and (EII_class1_op11_0["http://test.ns"
        #dp11string->>"egon"]@EII_MVN_3).
orderedby XRESULTVAR
```

6.3. Web Service Deployment and Execution

After having completed a query specification the query can be exposed in a web service.

Before a query can be deployed as a web service, the system has to generate a web service description, which consists of two parts.

Generate XML-Schema description for input parameters: Therefore, the generation process parses the internal query description data structure, searches for external variables, and creates element descriptions for these external variables.

Generate description for output documents: Therefore, the generation process parses the internal query description data structure, searches for output properties, and creates element descriptions for datatype properties and object references.

Web service description generation and query generation are done on the same internal data structure. It is important to keep these two processing steps in sync. This especially holds for the order of elements in the result. While the web service description implies order and multiplicity of these elements in XML schema sequences, the query generation has to construct F-Logic terms that will be transformed into matching XML documents.

The web service execution is implemented in a generic framework that accepts a web service description, a query description, and input parameters. In the end the web service delivers a query result as described in the web service's WSDL.

The query description is an XML document containing the query string in the chosen query language enriched with descriptions of external parameters.

It is the duty of the web service framework to replace external variables in the query description with actual input values. The web service will send the resulting query string to a specified inferencing engine.

Finally, the resulting F-Logic term structure as delivered from the inferencing engine will be transformed into an XML result document as follows:

The result's root element will be the local name of the class which had been used as a starting point for the query generation.

Each datatype property to be shown will be put into an XML element with the property's name. There will be no nesting of elements for lists of values.

For each object reference a nested XML element will be generated. Normally, this element receives the name of the object reference. In case the same object reference has been used multiple times during query definition, then the name of the object reference will be appended by "_" plus a sequence number.

The F-Logic query result term can contain strings indicating non-existence of values or object. The transformation to XML will skip such entries and will not generate any XML element for these.

The resulting XML document can be returned as the web service's invocation result.

6.4. Query Testing

Because it is too exhausting for users to always first create and deploy a web service before testing it, the system provides the functionality which allows for direct execution of a specified query. A dialog window asks for details about the server, to which the query shall be sent. The dialog window also asks for values of query parameters.

As already explained in the previous section, the resulting result terms will be transformed into an XML structure. The system can display resulting XML documents.

7. Inferencing

The ontolgies, as well as the language for the declarative rules, can differ. In one exemplary implementation of the invention, the object models are of the type OWL, while F-Logic is used as the rule language. In the future, OWL will be extended to encompass capabilities for defining rules.

To process inquiries, a query command is generated by the input web service. Depending on the query, a series of declarative rules is processed in the inference unit. Since the declarative rules based on predicate logic in general are a declarative system, the sequence for the definition of the declarative rules is not important.

The following illustrates the way the inference unit evaluates the rules to answer a query.

The most widely published inference approach for F-Logic is the alternating fixed point procedure [A. Van Gelder, K. A. Ross, and J. S. Schlipf: "The well-founded semantics for general logic programs"; Journal of the ACM, 38(3):620-650, July 1991]. This is a forward chaining method (see below) which computes the entire model for the set of rules, i.e. all facts, or more precisely, the set of true and unknown facts. For answering a query, the entire model must be computed (if possible) and the variable substitutions for answering the query are then derived.

Forward chaining means that the rules are applied to the data and derived data as long as new data can be deduced. Alternatively, backward chaining can be used. Backward chaining means that the evaluation has the query as starting point and looks for rules with suitable predicates in their heads that match with an atom of the body of the query. The procedure is recursively continued. Also backward chaining looks for facts with suitable predicate symbols.

An example for a predicate for the F-Logic expression Y[fatherIs->X] is father(X,Y), which means that X is the father of Y "father" is the predicate symbol. The F-Logic terminology is more intuitive than predicate logic. Predicate logic, however, is more suited for computation. Therefore, the F-Logic expressions of the ontology and query are internally rewritten in predicate logic before evaluation of the query.

In the preferred embodiment, the inference engine performs a mixture of forward and backward chaining to compute (the smallest possible) subset of the model for answering the query. In most cases, this is much more efficient than the simple forward or backward chaining evaluation strategy.

Figure 3:
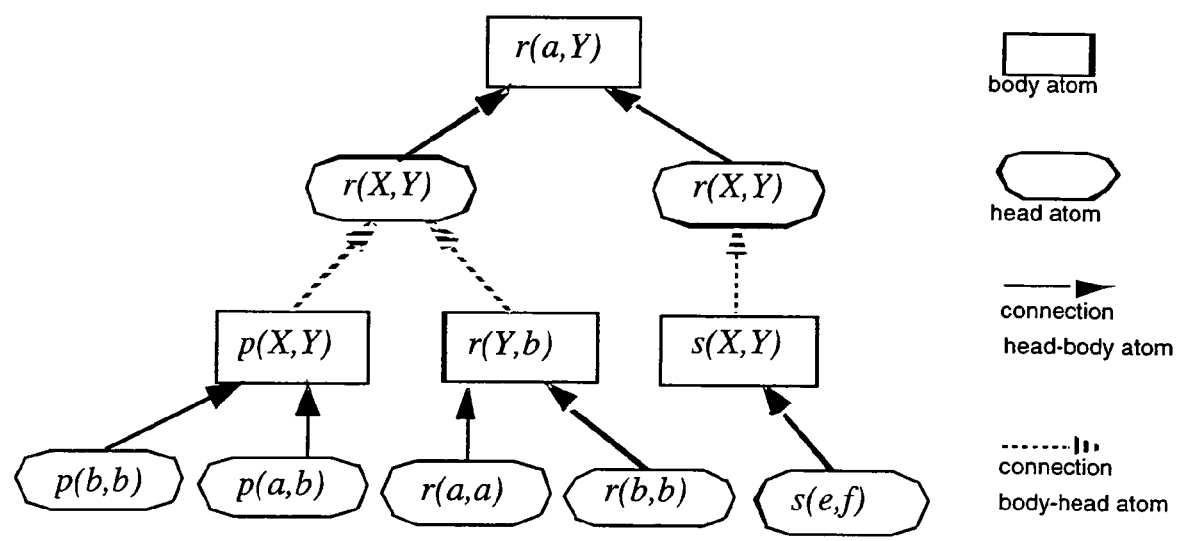
FIG. 3 shows an exemplary system graph.

The inference or evaluation algorithm works on a data structure called system graph (see e.g. FIG. 3). This graph represents the set of rules and their dependencies. Every atom of the rules (i.e. head or body, left hand or right hand side, or part of the body) is represented as a vertex of the graph. All atoms in the body of a rule—which may be connected by AND only—are connected to the head atom (header) of the rule by a connection or an edge. Every head atom, in turn, is upwardly connected to all body atoms with the same predicate symbol. Let's have a look at an example:

```
/* rules */
FORALL X,Y r(X,Y) <- p(X,Y) AND r(Y,b).
FORALL X,Y r(X,Y) <- s(X,Y).
/* facts */
q(a). p(b,b). p(a,b). r(a,a). r(b,b). s(e,f).
/* query */
FORALL Y <- r(a,Y).
```

This example is illustrated in FIG. 3.

The bottom-up evaluation using the system graph may be seen as a flow of data from the sources (facts) to the sinks (query) along the edges of the graph.

If a fact $q(a1, \ldots, an)$ flows from a head atom of rule r to a body atom $q(b1, \ldots, bn)$ of rule r' (along a solid arrow) a match operation takes place. This means that the body atom of rule r' has to be unified with the facts produced by rule r. All variable substitutions for a body atom form the tuples of a relation, which is assigned to the body atom. Every tuple of this relation provides a ground term (variable free term) for every variable in the body atom. To evaluate the rule, all relations of the body atoms are joined and the resulting relation is used to produce a set of new facts for the head atom. These facts again flow upwards in the system graph.

For the first rule

FORALL X,Y r(X,Y)<-p(X,Y) AND r(Y,b)

there are four possible input combinations, two facts for p(X,Y), namely p(b,b) and p(a,b), multiplied by two facts for r(Y,b), namely r(a,a) and r(b,b). Only the fact r(b,b) matches r(Y,b) in the rule, which leads to Y being b in the rule. With Y being b, there are two possible facts matching p(X,Y), namely p(b,b) and p(a,b). Thus, two new facts can be derived from the first rule on the left-hand side, namely r(b,b)<-p(b,b) AND r(b,b)

and r(a,b)<-p(a,b) AND r(b,b).

On the right hand side of the system graph according to FIG. 3, we see that the fact s(e,f) leads to r(e,f), applying the second rule. r(e,f), however, cannot be substituted into the query FORALL Y<-r(a,Y)

since a does not match e.

Only the fact r(a,b) derived with the first rule matches the query leading to the answer Y=b.

This evaluation strategy corresponds to the naive evaluation [J. D. Ullman: "Principles of Database and Knowledge-Base Systems"; vol. I, Computer Sciences Press, Rockville, Md., 1988] and is the basis for the above mentioned alternating fixed point procedure. Because the system graph may contain cycles (in case of recursion within the set of rules) semi naive evaluation [J. D. Ullman: "Principles of Database and Knowledge-Base Systems"; vol. I, Computer Sciences Press, Rockville, Md., 1988] is applied in the preferred embodiment to increase efficiency.

The improved bottom-up evaluation (forward chaining) of the example mentioned above is shown in FIG. 4. The facts flowing to a vertex are shown in the bubble attached to the vertex.

Figure 4:
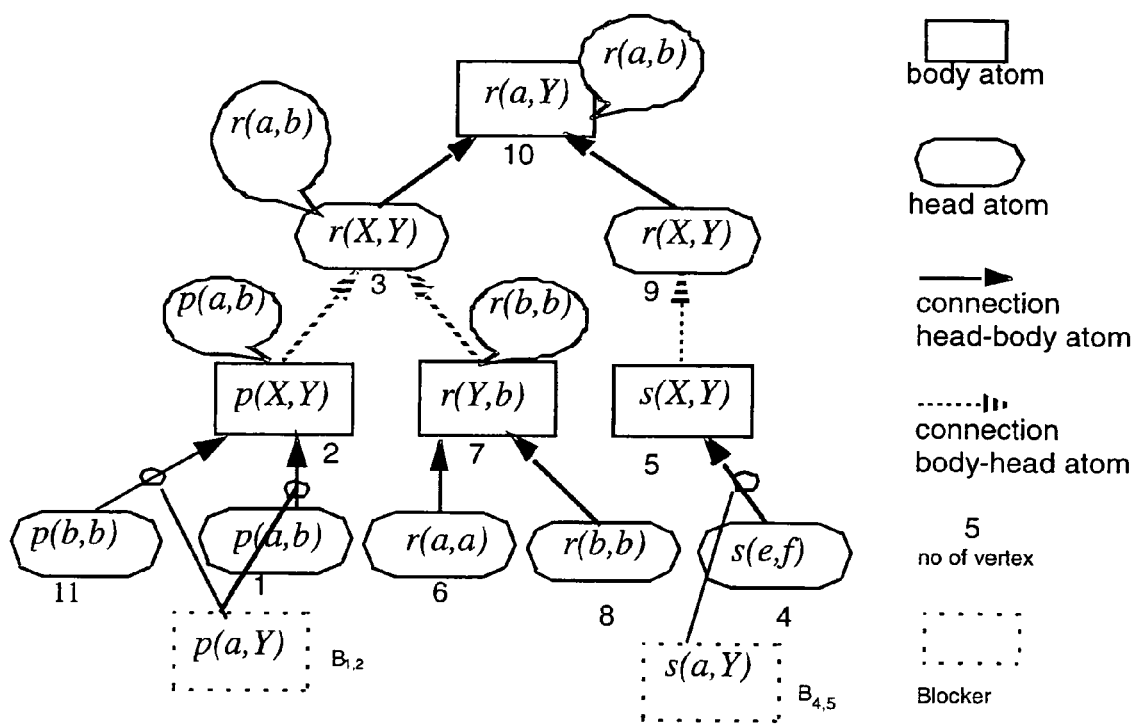
FIG. 4 shows the exemplary system graph according to FIG. 3 with improved bottom up evaluation.

FIG. 4 exemplifies that facts are created for the vertices although they are useless for answering the posed query. For instance the fact p(b,b) (vertex 11) flowing to the body vertex p(X,Y) (vertex 2) cannot contribute in any way to the answer, because in the query r(a,Y) only instances of the variable X which are equal to the constant a are relevant. Such useless facts then in turn produce new useless facts in the subsequent evaluation.

The key idea of the preferred embodiment is to abort the flow of useless facts as early as possible (i.e. as close to the sources of the graph as possible) attaching so-called blockers to the head-body edges of the graph. Such a blocker consists of a set of atoms. A blocker lets a fact pass, if there exists an atom within the blocker which matches with the fact.

For instance the blocker B1,2 between vertex 1 and vertex 2, B1,2={p(a,Y)} prevents the fact p(b,b) from flowing to the vertex 2. Additionally, the creation of the fact r(b,b) for vertex 3 is prevented by a corresponding blocker B7,3 (not shown) between vertex 7 and vertex 3. Similarly, the blocker B4,5={s(a,Y)} between vertex 4 and vertex 5 blocks the flow of facts on the right-hand side of the system graph.

Thus, the answer to the posed query r(a,Y) remains the same, although the amount of facts flowing through the graph is reduced.

The blockers at the edges of the system graph are created by propagating constants within the query, within the rules, or within already evaluated facts downwards in the graph. For instance the blocker B1,2={p(a,Y)} is determined using the constant a at the first argument position of the query r(a,Y). This blocker is valid because for the answer only facts at vertex 3 are useful containing an 'a' as first argument. So variable X in the first rule must be instantiated with 'a' in order to be useful for the query.

The blockers at the edges of the system graph are created during the evaluation process in the following way. First of all, constants within the query and within the rules are propagated downwards in the graph. Starting at the query or at a body atom, they are propagated to all head atoms, which are connected to this atom. From the head atoms they are propagated to the first body atom of the corresponding rule and from there in the same way downwards. In propagating the constants downwards, they produce new blocker atoms for the blockers at the sources.

Alternatively, blockers can also be applied in the upper layers of the system graph, but this does not lead to an improvement of the performance. Therefore, blockers are only applied at the sources of the graph.

While the present inventions have been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from their spirit or essential characteristics. The described embodiments are considered in all respects to be illustrative and not restrictive. The scope of the inventions is, therefore, indicated by the appended claims, rather than by the foregoing description. All changes which come within the meaning and range of equivalence of the claims are to be embraced within their scope.

REFERENCES

XML data sources
DB1 data sources
DB2 data sources
RPC remote procedure call and standing for a web service
100 source ontology
102 source ontology
104 source ontology
106 source ontology
108 integration ontology
V1 external view
V2 external view
V3 external view
WS1 web service
WS2 web service
WS3 web service
110 runtime unit

REFERENCES CITED

US 2004/0216030 A1
US 2004/0093559 A1
US 2004/0093344 A1
US 2003/0179228 A1
US 2003/0177481 A1
US 2003/0163597 A1
US 2003/0163450 A1
US 2003/0120665 A1
US 2003/0101170 A1
J. Angele, G. Lausen: "Ontologies in F-Logic" in S. Staab, R. Studer (Eds.): Handbook on Ontologies in Information Systems. International Handbooks on Information Systems, Springer, 2003, page 29 ff.
A. Van Gelder, K. A. Ross, and J. S. Schlipf: "The well-founded semantics for general logic programs"; Journal of the ACM, 38(3):620-650, July 1991.
J. D. Ullman: "Principles of Database and Knowledge-Base Systems"; vol. I, Computer Sciences Press, Rockville, Md., 1988.

---

Appendix A

```
// Ontology generated by OntoEdit
<oxml:ontology
    xmlns:xs="http://www.w3.org/2001/XMLSchema#"
    xmlns:b="http://mynamespace.org#"
    xmlns:oxml="http://schema.ontoprise.com/oxml/core/2.1#"
    xmlns:a="http://mymodule.org#"
    xmlns:xsi="http://www.w3.org/2001/XMLSchema-instance"
    xsi:schemaLocation="http://schema.ontoprise.com/oxml/core/2.1# oxml2.1.xsd"
    id="http://mymodule.org#">
    <oxml:concept id="http://mynamespace.org#MYADABASFILENAME"/>
    <oxml:relation id="http://mynamespace.org#A1" domain="http://mynamespace.org#MYADABASFILENAME" range="http://www.w3.org/2001/XMLSchema#string" minCard="1.0" maxCard="1.0"/>
    <oxml:relation id="http://mynamespace.org#UM" domain="http://mynamespace.org#MYADABASFILENAME" range="http://www.w3.org/2001/XMLSchema#number" minCard="1.0" maxCard="1.0"/>
    <oxml:relation id="http://mynamespace.org#U4" domain="http://mynamespace.org#MYADABASFILENAME" range="http://www.w3.org/2001/XMLSchema#number" minCard="1.0" maxCard="1.0"/>
    <oxml:relation id="http://mynamespace.org#U1" domain="http://mynamespace.org#MYADABASFILENAME" range="http://www.w3.org/2001/XMLSchema#number" minCard="1.0" maxCard="1.0"/>
    <oxml:relation id="http://mynamespace.org#PM" domain="http://mynamespace.org#MYADABASFILENAME" range="http://www.w3.org/2001/XMLSchema#number" minCard="1.0" maxCard="1.0"/>
    <oxml:relation id="http://mynamespace.org#P4" domain="http://mynamespace.org#MYADABASFILENAME" range="http://www.w3.org/2001/XMLSchema#number" minCard="1.0" maxCard="1.0"/>
    <oxml:relation id="http://mynamespace.org#P1" domain="http://mynamespace.org#MYADABASFILENAME" range="http://www.w3.org/2001/XMLSchema#number" minCard="1.0" maxCard="1.0"/>
    <oxml:relation id="http://mynamespace.org#G8" domain="http://mynamespace.org#MYADABASFILENAME" range="http://www.w3.org/2001/XMLSchema#number" minCard="1.0" maxCard="1.0"/>
    <oxml:relation id="http://mynamespace.org#G4" domain="http://mynamespace.org#MYADABASFILENAME" range="http://www.w3.org/2001/XMLSchema#number" minCard="1.0" maxCard="1.0"/>
    <oxml:relation id="http://mynamespace.org#F4" domain="http://mynamespace.org#MYADABASFILENAME" range="http://www.w3.org/2001/XMLSchema#number" minCard="1.0" maxCard="1.0"/>
    <oxml:relation id="http://mynamespace.org#F2" domain="http://mynamespace.org#MYADABASFILENAME" range="http://www.w3.org/2001/XMLSchema#number" minCard="1.0" maxCard="1.0"/>
    <oxml:relation id="http://mynamespace.org#B4" domain="http://mynamespace.org#MYADABASFILENAME" range="http://www.w3.org/2001/XMLSchema#number" minCard="1.0" maxCard="1.0"/>
    <oxml:relation id="http://mynamespace.org#B1" domain="http://mynamespace.org#MYADABASFILENAME" range="http://www.w3.org/2001/XMLSchema#number" minCard="1.0" maxCard="1.0"/>
    <oxml:relation id="http://mynamespace.org#AM" domain="http://mynamespace.org#MYADABASFILENAME" range="http://www.w3.org/2001/XMLSchema#string" minCard="1.0" maxCard="1.0"/>
    <oxml:relation id="http://mynamespace.org#A4" domain="http://mynamespace.org#MYADABASFILENAME" range="http://www.w3.org/2001/XMLSchema#string" minCard="1.0" maxCard="1.0"/>
    <oxml:axiom id="http://mynamespace.org#dbrule">
        <oxml:text language="flogic">RULE "http://mynamespace.org"#dbrule@"http://mymodule.org"#" ":FORALL VAR0,VAR1,VAR2,VAR3,VAR4,VAR5,VAR6,VAR7,VAR8,VAR9,VAR10,VAR11,VAR12,VAR13,VAR14,VAR15 ( c("http://mynamespace.org"#MYADABASFILENAME,VAR0):"http://mynamespace.org"#MYADABASFILENAME["http://mynamespace.org"#A1->>VAR1;"http://mynamespace.org"#A4->>VAR2;"http://mynamespace.org"#AM->>VAR3;"http://mynamespace.org"#B1->>VAR4;"http://mynamespace.org"#B4->>VAR5;"http://mynamespace.org"#F2-
```

-continued

Appendix A

```
>>VAR6;"http://mynamespace.org"#F4->>VAR7;"http://mynamespace.org"#G4->>VAR8;"http://mynamespace.org"#G8-
>>VAR9;"http://mynamespace.org"#P1->>VAR10;"http://mynamespace.org"#P4->>VAR11;"http://mynamespace.org"#PM-
>>VAR12;"http://mynamespace.org"#U1->>VAR13;"http://mynamespace.org"#U4->>VAR14;"http://mynamespace.org"#UM-
>>VAR15]) <- (
adaaccess("62",F(VAR0,"A1",VAR1,"A4",VAR2,"AM",VAR3,"B1",VAR4,"B4",VAR5,"F2"VAR6,"F4",VAR7,"G4",VAR8,"G8",VAR
9,"P1",VAR10,"P4",VAR11,"PM",VAR12,"U1",VAR13,"U4",VAR14,"UM",VAR15),"218")).</oxml:text>
    </oxml:axiom>
</oxml:ontology>
```

The invention claimed is:

1. A system for unified querying of distributed data sources conforming to different data schema comprising:
   a) a plurality of data sources conforming each to a given data schema,
   a1) each data schema having constructs for organizing the data and
   a2) each data schema having a data schema query language associated therewith;
   b) a plurality of source ontologies (100, 102, 104, 106), each corresponding to one data source,
   b1) whereby each source ontology comprises a group of constructs,
   c) a mapping between each data source and its corresponding source ontology,
   c1) wherein constructs of the data schema of the data source are mapped to constructs of the source ontology, and
   c2) wherein the mapping comprises means for querying the data source with the data schema query language of the data source, and
   c3) wherein the mapping between each data source and its corresponding source ontology is accomplished using a declarative system of rules based on predicate logic;
   d) an integration ontology (108),
   d1) whereby the integration ontology comprises a group of constructs,
   e) a mapping between each source ontology and the integration ontology,
   e1) wherein constructs of the source ontologies are mapped to constructs of the integration ontology, and
   e2) wherein the mapping between the source ontologies and the integration ontology is accomplished using a declarative system of rules based on predicate logic;
   f) query means for inputting a query related to the data of the data sources; and
   g) at least one inference unit (110) based on predicate logic for evaluating the query with the help of the rules.

2. System according to claim 1 comprising means for automatically generating a source ontology (100, 102, 104, 106) corresponding to a data source and its data schema.

3. System according to claim 1 comprising means for automatically generating the mapping between a source ontology and its corresponding data source.

4. System according to claim 1 comprising means for enabling the inference unit (110) to dynamically access the rules and the structure of the ontologies during the evaluation of a query.

5. System according to claim 1 whereby the integration ontology has an ontology query language associated therewith; and the system comprising means for translating the query into the ontology query language of the integration ontology.

6. System according to claim 1 characterized by at least one of the ontologies being complemented by a declarative system of rules based on predicate logic for expressing additional information.

7. System according to claim 1 characterized by the query means comprising at least one query unit in the form of a web service for inputting a query related to the data of the data sources.

8. System according to claim 1 comprising means for identifying queries or rules or combinations of rules that can be combined into a complex query in the data schema query language of the data source, and means for translating these queries or rules or combinations of rules into a complex query in the data schema query language of the data source.

9. System according to claim 1 comprising means for dynamically filtering those data or rules or queries which cannot have an impact on answering the query posed on the web service level.

10. System according to claim 1 comprising a plurality of integration ontologies, integrating different data sources or integrating identical data sources and representing each a different view on the data.

11. A method for unified querying of distributed data sources conforming to different data schema comprising the steps:
   a) choosing a plurality of data sources conforming each to a given data schema,
   a1) each data schema having constructs for organizing the data and
   a2) each data schema having a data schema query language associated therewith;
   b) creating a plurality of source ontologies (100, 102, 104, 106), each corresponding to one data source,
   b1) whereby each source ontology comprises a group of constructs,
   c) defining a mapping between each data source and its corresponding source ontology,
   c1) wherein constructs of the data schema of the data source are mapped to constructs of the source ontology, and
   c2) wherein the mapping comprises means for querying the data source with the data schema query language of the data source, and
   c3) wherein the mapping between each data source and its corresponding source ontology is accomplished using a declarative system of rules based on predicate logic;
   d) defining an integration ontology (108),
   d1) whereby the integration ontology comprises a group of constructs, e) defining a mapping between each source ontology and the integration ontology,
e1) wherein constructs of the source ontologies are mapped to constructs of the integration ontology, and
e2) wherein the mapping between the source ontologies and the integration ontology is accomplished using a declarative system of rules based on predicate logic;
f) inputting a query related to the data of the data sources; and
g) evaluating the query with the help of the rules using at least one inference unit (110) based on predicate logic.

12. A computer loadable data structure, that is adapted to perform the method according to claim 11 while the data structure is being executed on a computer.

13. Computer program, wherein the computer program is adapted to perform the method according to claim 11 while the computer program is being executed on a computer.

14. Computer program comprising program means for performing the method according to claim 11 while the computer program is being executed on a computer or on a computer network.

15. Computer program comprising program means according to claim 11, wherein the program means are stored on a storage medium readable to a computer.

16. A storage medium, wherein a data structure is stored on the storage medium and wherein the data structure is adapted to perform the method according to claim 11 after having been loaded into a main and/or working memory of a computer or of a computer network.

17. Computer program product having program code means, wherein the program code means can be stored or are stored on a storage medium, for performing the method of claim 11, if the program code means are executed on a computer or on a computer network.

18. At least one of an operating system, a computer readable medium having stored thereon a plurality of computer-executable instructions, a co-processing device, a computing device and a modulated data signal carrying computer executable instructions for performing the method of claim 11.

* * * * *